United States Patent [19]
Betts

[11] Patent Number: 4,637,035
[45] Date of Patent: Jan. 13, 1987

[54] DIGITAL MODEM FOR MULTIPLE TELEPHONE CIRCUITS

[75] Inventor: William L. Betts, St. Petersburg, Fla.

[73] Assignee: Paradyne Corporation, Largo, Fla.

[21] Appl. No.: 580,672

[22] Filed: Feb. 16, 1984

[51] Int. Cl.$^4$ ............................................. H04B 3/06
[52] U.S. Cl. ........................................ 375/8; 375/12; 375/13; 370/58
[58] Field of Search ..................... 370/58, 77, 85, 94; 340/825.1, 825.11, 825.2, 825.5; 375/8, 12, 13, 14

[56] References Cited

U.S. PATENT DOCUMENTS

| | | | |
|---|---|---|---|
| 3,566,271 | 2/1971 | Whang et al. | 375/12 |
| 4,263,670 | 4/1981 | Sherman | 375/9 |
| 4,285,061 | 8/1981 | Ho | 333/18 |
| 4,345,250 | 8/1982 | Jacobsthal | 340/825.5 |
| 4,354,263 | 10/1982 | Bordry et al. | 370/94 |

*Primary Examiner*—Benedict V. Safourek
*Attorney, Agent, or Firm*—Kane, Dalsimer, Kane, Sullivan & Kurucz

[57] ABSTRACT

A modem for exchanging information between a plurality of remote DTE's and a plurality of local master DTE's is disclosed having multiple line interface and DTE interface circuits. Preferably a single microprocessor is used to process all the signals between the respective lines and DTE interface circuits. Furthermore the microprocessor is also used to calculate and update the operational parameters of the line interface circuits such as equalizer coefficients, A/D or D/A attenuator coefficients.

6 Claims, 3 Drawing Figures

DIGITAL MODEM FOR MULTIPLE TELEPHONE CIRCUITS

BACKGROUND OF THE INVENTION

1. Field of Invention

This invention pertains to a modem for transceiving digital data, and more particularly to a modem for receiving and transmitting said data simultaneously from one or more central DTE to several remote DTE's over a plurality of telephone lines.

2. Description of the Prior Art

Previously communication between a master local DTE and several remote DTE's has been provided by several centrally located local modems, one for each remote DTE, each local modem being connected to a corresponding remote modem via a suitable communication channel. Each modem had its own cost, space, power consumption and output heat requirements. Meanwhile often the individual modems were not used at their fullest capacity.

OBJECTIVES AND SUMMARY OF THE INVENTION

In view of the above, a major objective of this invention is to provide a modem which can take the place of several modems.

Other advantages shall become more apparent in the following description of the invention.

A master local modem for communication over data channels according to this invention comprises several interface circuits adapted to transmit and receive analog data signals over said channels, means for transmitting said data to or from corresponding data terminal equipment and a single microprocessor for controlling said interface circuits and the transfer and processing of said data signals. The microprocessor is also adapted to calculate and update operational parameters of the channel interface circuits such as the equalizer coefficients, and A/D attenuation constants and so forth.

DESCRIPTION OF THE PREFERRED EMBODIMENT

Figure 1:
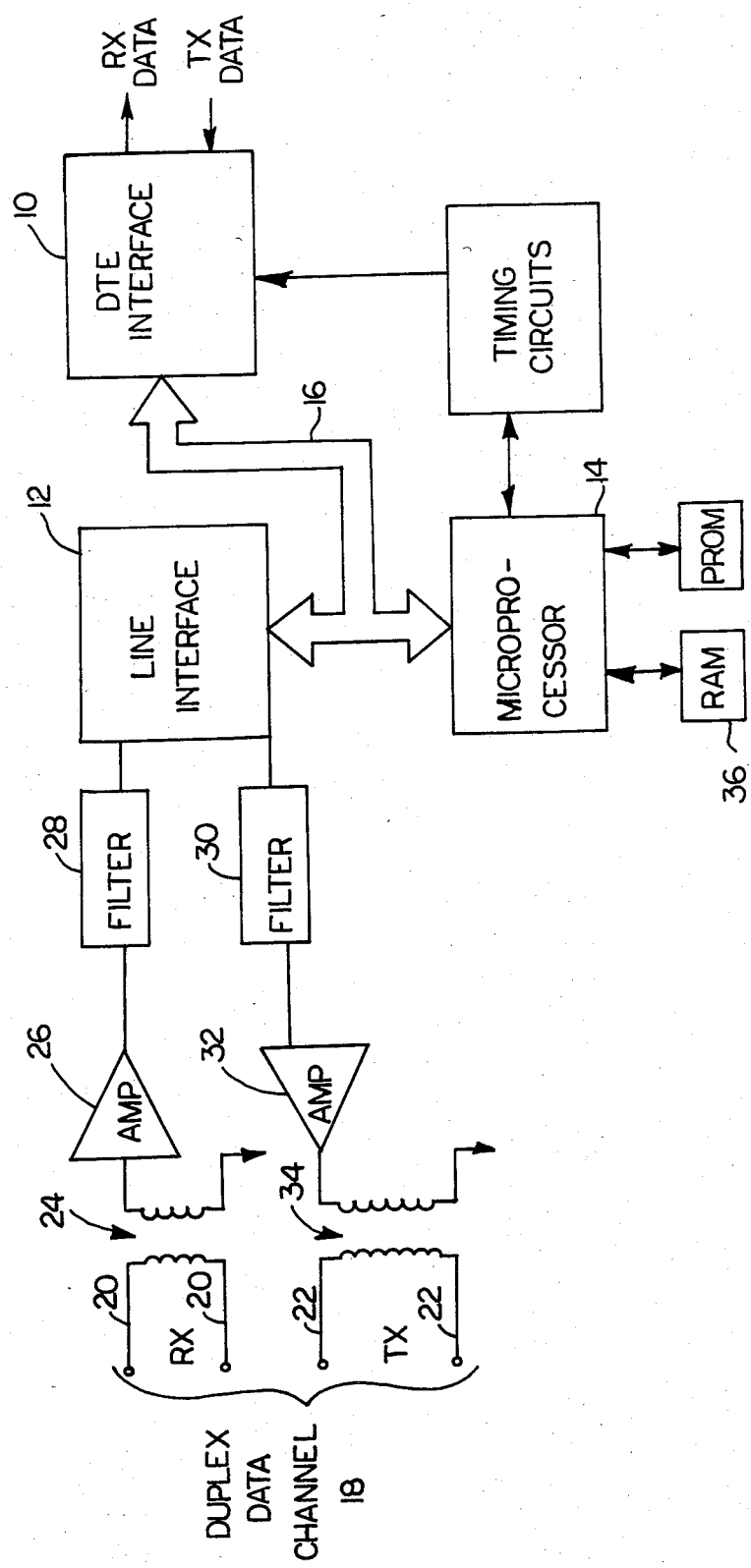
FIG. 1 shows a typical digital modem which makes use of a microprocessor.

The components of a typical modem having a microprocessor is shown in FIG. 1. One such modem is the MP-48 made by Paradyne Corporation of Largo, Fla., and described in its publication MP 48-777-10MM, pages 4-2. (See also the paper entitled "Bit Slice Microprocessor Application For the 4 Khz Channel" by William L. Betts published in "Advances in Digital Signal Processing: Hardware and Techniques, 1979 I.E.E.E. Electro Professional Program, New York, N.Y., Apr. 24-26, 1979.)

The modem comprises a data terminal equipment (DTE) interface module 10, a microprocessor 14 and a line interface module 12. These components are interconnected by a common data bus 16. The function of these components is best explained by tracing the analog and digital signals through the modem. The modem is connected to a standard data communication channel such as duplex channel 18 having two separate pairs of lines: RECEIVE lines 20,20 and TRANSMIT lines 22,22. These lines may consist of lines leased from a local telephone company. Signals received on RECEIVE (Rx) lines 20 are transferred by a transformer 24 to an amplifier 26. The transformer is used to balance lines 20,20. The amplifier signals pass through a filter 28 and then are fed into the line interface module 12. The interface module consists of filters, and A/D and D/A converter circuits. The digitized signals from the interface are transferred to microprocessor 14 which performs all the function necessary to convert them into binary digital signals. For example of the duplex channel 18 is used for QAM or PSK-type signals, the digitized signals consist of real time samples of the analog line signals. These signals are demodulated, adaptively equalized and decoded by the microcomputer which generates corresponding binary signals. The binary signals are then sent to the DTE. The DTE interface circuit 10 may also perform various monitoring and testing of the modem and channel performance as described in commonly assigned U.S. Pat. No. 4,381,546 to T. R. Armstrong.

The DTE and the DTE interface circuit also exchange various control signals for coordinating their operation.

Binary data for transmission received from the DTE is sent by the interface circuit 10 to the microprocessor 14. The microprocessor converts the binary signals into corresponding time-sampled digitized signals. The digitized signals are sent to the line interface module 12 for conversion to analog systems. The analog signals are filtered by filter 30 and amplified by amplifier 32 before being transferred by transformer 34 to the TRANSMIT lines 22,22.

The microprocessor 14 program, among other duties, performs the function of an adaptive equalizer with tap coefficients. These tap coefficients are initialy set during the training period which is typically part of the power-up routine or automatically. The coefficients associated with a particular communication channel are stored in RAM 36 and are periodically updated by the microprocessor in the range of its normal routine.

Microprocessors capable of performing the above-described functions are described in the above referenced paper by William L. Betts.

As mentioned above, a local master modem such as the one illustrated in FIG. 1 is required to transmit or receive signals from eacn remote location.

Figure 2:
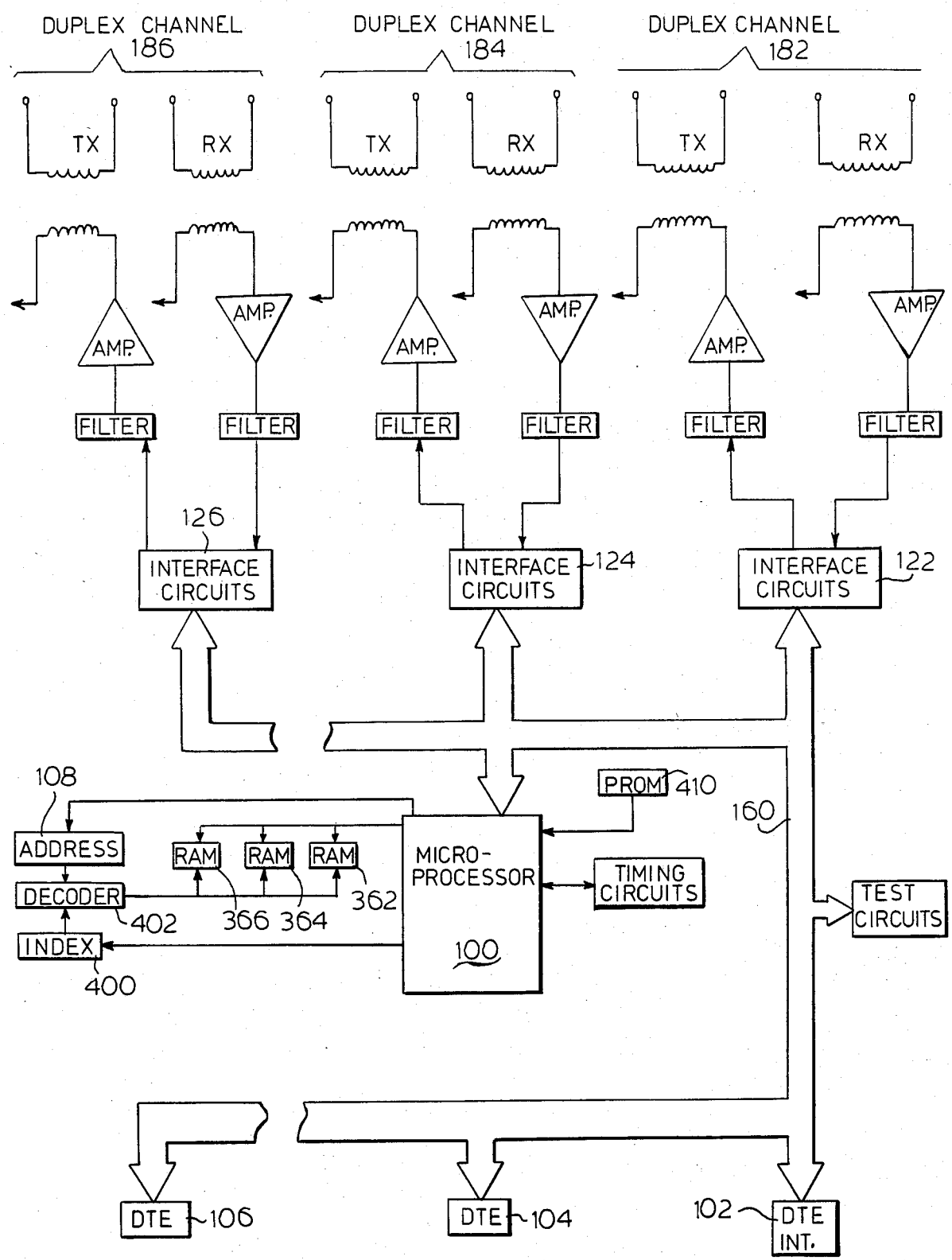
FIG. 2 shows the components of the modem adapted according to the present invention to the take place of several modems of the type shown in FIG. 1.

One shortcoming of the modem described above and FIG. 1 is that the modem is underutilized because the functions performed by the microprocessor occupy only a fraction of its normal duty cycle. Therefore, according to this invention a modem is provided as shown in FIG. 2, in which a single microprocessor is used to process the signals between a plurality of line interface circuits and DTE interface circuits. For this purpose, DTE interface circuits 102, 104 and 106 are interconnected with line interface modules 122, 124 and 126, and microprocessor 100 by bus 160. The line interface modules are connected to individual duplex channels 182, 184 and 186 via transformers, filters and amplifiers as shown in the identical manner described in FIG. 1.

The microprocessor services each DTE interface circuit and line interface modules in sequence. The tap coefficients of each equalizer are set separately during the initial training period and stored in RAMs 362,364 and 366. To keep track of which circuit and/or module is being serviced at a particular moment, an indexer 400 and decoder circuit 402 are used in conjunction with an address register 108.

The line interface modules could comprise individual circuits for each function i.e. A/D, and D/A converters and filters. However, they could also comprise a single large scale intergration (LSI) CMOS chip such as the one described by Bahram Fotouhi and Roubik Gregorian in their article entitled "A SINGLE-CHIP HIGH-SPEED CMOS ANALOG MODEM FRONT-END" in the publication CH 1859-8/83/0000/0084 of the Institute of Electrical and Electronic Engineers.

Figure 3:
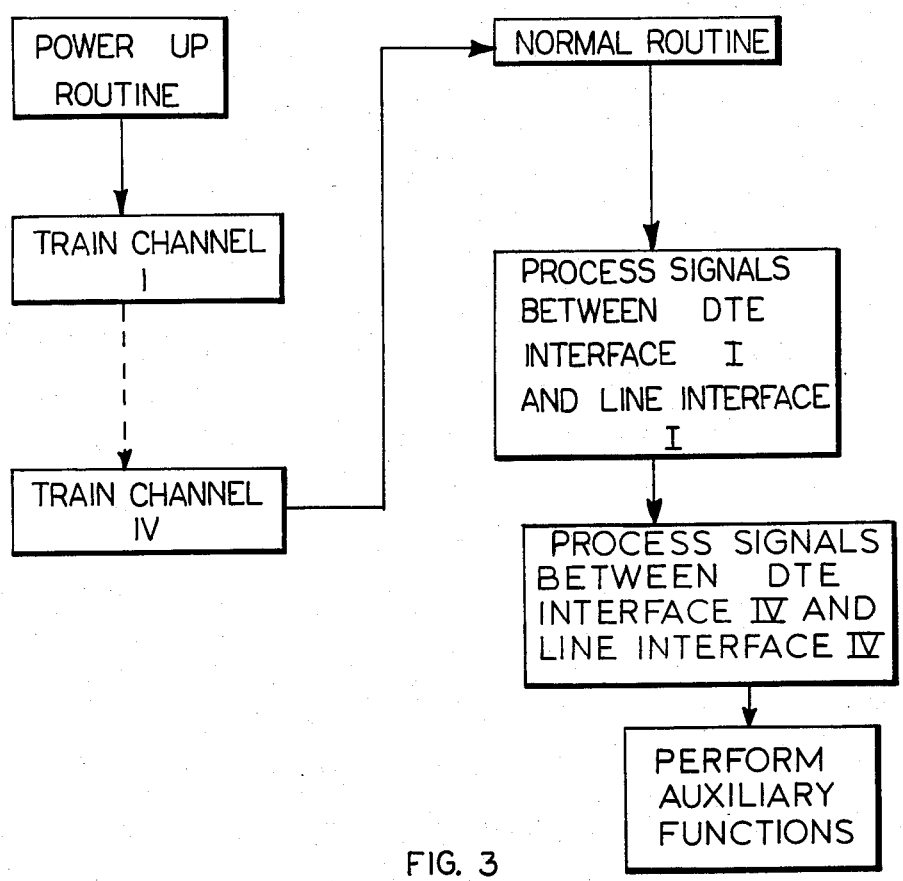
FIG. 3 shows a flow chart for the programming of the modem microprocessor.

A flow chart describing the functions of the microprocessor is shown in FIG. 3. Initially as part of the POWER UP routine a training sequence is run on each duplex channel during which the appropriate equalizer coefficients for each channel are determined and stored in the appropriate RAM. Once the POWER UP routine is completed, the microprocessor starts performing the functions defined in the NORMAL ROUTINE. During this routine, each line interface module and the corresponding DTE interface circuit is sequentially accessed and the data signals are modulated and demodulated as required. As part of this data signal processing phase, the signals are filtered, equalized, scrambled/descrambled, mixed. encoded/decoded, modulated/demodulated etc. depending on the modulation scheme utilized by the system.

Furthermore the process also performs ancillary functions related to updating the variables used in the data processing functions, such as the equalizer coefficients. Performance analysis including both channel improvement such as frequency offset and phase error calculations is also performed as part of the data signal processing functions. While the data signal processing functions are performed every time a given line and data interface pair is accessed, the ancillary functions are performed only as required. Alternately the ancillary functions could be performed after each DTE interface has been accessed a preselected number of times, or after a preselected time period such as every 10 miliseconds.

Using a single modem for exchanging data between several DTE's and data channels results in cost, power and space reduction because a single device is used to replace several individual devices.

Obviously modifications in the invention maybe made without departing from the scope of the invention as defined in the appended drawings.

What is claimed is:

1. A modem for exchanging data signals between a plurality of local data terminals and remote data terminals over individual data channels, each channel connecting said modem to one of said remote terminals comprising:
   a plurality of terminal interfacing modules for receiving binary signals from said local data terminals, each module being connected to a corresponding local data terminal;
   a single microprocessor means for receiving said binary signals from said terminal interfacing means, said microprocessor means being provided to convert said binary signals into corresponding time-sampled transmit digitized signals; and
   a plurality of line interfacing modules, each line interfacing module being connected to one of said channels, said line interfacing modules being provided for converting said transmit digitized signals to transmit analog signals for transmission over said channels;
   said plurality of line interfacing modules being further provided for receiving analog signals from said channels and converting them into received digitized signals;
   said microprocessor being programmed to adaptively equalize said received digitized signals and to convert the equalized signals into received binary signals;
   said plurality of terminal interfacing modules being further provided for transmitting said received binary signals to said local data terminals.

2. The modem of claim 1 further comprising bussing means for transfering signals between the interfacing modules and the microprocessing means.

3. The modem of claim 2 wherein said microprocessor is programmed to obtain a set of equalizer coefficients for each of said data channels, said coefficients being obtained during a training period which preceeds data exchange on each of said data channels.

4. The modem of claim 3 wherein such microprocessor is further programmed to periodically update said equalizer coefficients.

5. The modem of claim 4 further comprising memory means for storing said equalizer coefficients.

6. The modem of claim 5 further comprising indexer means coupled to said microprocessor for directing said microprocessor to said data channels and terminals in a predetermined sequence.

* * * * *

UNITED STATES PATENT AND TRADEMARK OFFICE
CERTIFICATE OF CORRECTION

PATENT NO. : 4,637,035
DATED : January 13, 1987
INVENTOR(S) : William Betts

It is certified that error appears in the above-indentified patent and that said Letters Patent is hereby corrected as shown below:

Col. 1, line 10, replace "DTE's" with --DTEs--.
Col. 1, line 13, after "Previously" insert --,--.
Col. 1, line 14, replace "DTE's" with --DTEs--.
Col. 2, line 9, after "The" insert --line--.
Col. 2, line 10, after "module" insert --12--.
Col. 2, line 12, after "interface" insert --12--.
Col. 2, line 13, replace "function" with --functions--.
Col. 2, line 14, after "example" insert --,--.
Col. 2, line 14, replace "of" with --if--.
Col. 2, line 18, replace "microcomputer" with --microprocessor 14--.
Col. 2, line 30, after "microprocessor" insert --14--.
Col. 2, line 39, after "set" insert --either--.
Col. 2, line 40, after "period" insert --,--.
Col. 2, line 41, after "routine" insert --,--.
Col. 2, line 67, after "microprocessor" insert --100--.
Col. 2, line 68, replace "modules" with --module--.
Col. 3, line 34, after "Furthermore" insert --,--.
Col. 4, line 1, replace "maybe" with --may be--.

UNITED STATES PATENT AND TRADEMARK OFFICE
CERTIFICATE OF CORRECTION

PATENT NO. : 4,637,035
DATED : January 13, 1987
INVENTOR(S) : William Betts

It is certified that error appears in the above-indentified patent and that said Letters Patent is hereby corrected as shown below:

Col. 4, line 15, replace "interfacing means," with --interfacing modules,--.

Signed and Sealed this

Twenty-sixth Day of October, 1999

Attest:

Attesting Officer

Q. TODD DICKINSON

Acting Commissioner of Patents and Trademarks